US006623846B2

(12) United States Patent
Laird

(10) Patent No.: US 6,623,846 B2
(45) Date of Patent: Sep. 23, 2003

(54) LOW-EMISSIVITY GLASS COATINGS HAVING A LAYER OF NITRIDED NICHROME AND METHODS OF MAKING SAME

(75) Inventor: Ronald E. Laird, Washtenaw, MI (US)

(73) Assignee: Guardian Industries Corp., Auburn HIlls, MI (US)

(*) Notice: Subject to any disclaimer, the term of this patent is extended or adjusted under 35 U.S.C. 154(b) by 0 days.

(21) Appl. No.: 09/797,903

(22) Filed: Mar. 5, 2001

(65) Prior Publication Data

US 2001/0041252 A1 Nov. 15, 2001

Related U.S. Application Data

(60) Provisional application No. 60/187,039, filed on Mar. 6, 2000.

(51) Int. Cl.[7] ................................................ B32B 17/06

(52) U.S. Cl. ........................ 428/216; 428/432; 428/701; 428/702; 428/428; 428/469

(58) Field of Search ............................ 428/34, 46, 212, 428/336, 448, 450, 426, 432, 469, 428, 698, 699, 700, 701, 702, 704, 669, 673, 680, 666, 689; 65/32.4, 60.2, 106, 114

(56) References Cited

U.S. PATENT DOCUMENTS 4,965,121 A 10/1990 Young et al.
5,342,675 A * 8/1994 Kobayashi et al. ......... 174/250
5,344,718 A 9/1994 Hartig et al. ............... 428/622
5,376,455 A 12/1994 Hartig et al. ............... 428/428
5,377,045 A 12/1994 Wolfe et al.
5,514,476 A 5/1996 Hartig et al. ............... 428/426
5,521,765 A 5/1996 Wolfe
5,563,734 A 10/1996 Wolfe et al.
5,584,902 A 12/1996 Hartig et al. ................ 65/32.4
5,770,321 A 6/1998 Hartig et al. ............... 428/622
5,800,933 A * 9/1998 Hartig et al. ................. 428/34
6,001,485 A 12/1999 Kobayashi et al. ......... 428/428
6,014,872 A 1/2000 Hartig et al. .................. 65/58
6,114,043 A * 9/2000 Joret .......................... 359/580
6,461,731 B1 * 10/2002 Veerasamy et al. ......... 428/408
2002/0031674 A1 * 3/2002 Laird ......................... 428/472
2002/0136905 A1 9/2002 Medwick et al.

FOREIGN PATENT DOCUMENTS

EP 0 567 735 A1 3/1993 ........... C03C/17/36
EP 0 796 825 A2 9/1997 ........... C03C/17/36
WO WO 98/58885 12/1998 ........... C03C/17/34

OTHER PUBLICATIONS

Technical Digest 1995, "Optical Interference Coatings", Wolfe et al., vol. 17, pp. 115–117 (No Month).

* cited by examiner

*Primary Examiner*—Deborah Jones
*Assistant Examiner*—Vivek Koppikar
(74) *Attorney, Agent, or Firm*—Nixon & Vanderhye P.C.

(57) ABSTRACT

Low-E glass coated glass articles are comprised of a glass substrate and a multiple layer coating on a surface of the glass substrate. Relatively high light transmissivity of greater than about 72% and satisfactory color characteristics are achieved. The coating includes a layer of a transparent dielectric material adjacent the surface of the glass substrate, and respective layers of nitrided nichrome and silver each of which are formed by sputter-coating onto the glass substrate in a nitrogen-containing atmosphere. Most preferably, the coating also includes a layer of silicon oxynitride interposed between the layer of dielectric material and the layer of nitrided nichrome. The silicon oxynitride layer may include an oxygen gradient layer wherein the concentration of oxygen decreases from one location in the silicon oxynitride layer to another location at a different depth in that same layer. If present, the oxygen gradient is most preferably such that the greater amount of oxygen concentration is nearer the bottom of the layer (i.e., towards the glass substrate) with the lesser amount of oxygen concentration being nearer the top of the layer (i.e., away from the glass layer).

15 Claims, 3 Drawing Sheets

Figure 1:
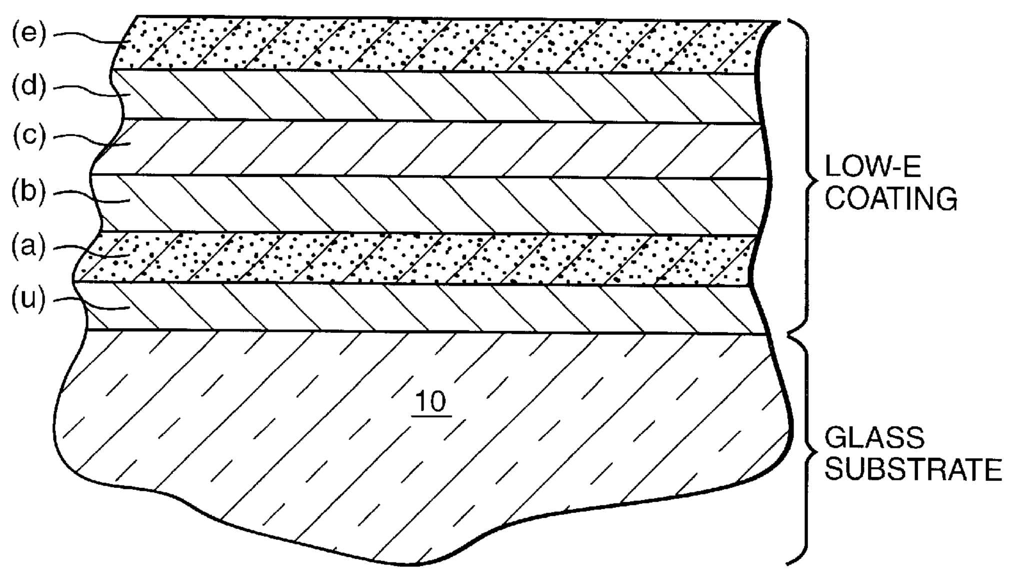

(e)
(d)
(c)
(b)
(a)
(u)
LOW-E COATING
10
GLASS SUBSTRATE

% Transmission
a*, b* Values
Sample
Transmission
Trans a*
Trans b*
1
2
3
4
5
6
7
8
9
80
75
70
65
60
55
50
5
4
3
2
1
0
-1
-2
-3
-4
-5

LOW-EMISSIVITY GLASS COATINGS HAVING A LAYER OF NITRIDED NICHROME AND METHODS OF MAKING SAME

CROSS-REFERENCE TO RELATED APPLICATION

This application is based on, and claims domestic priority benefits under 35 USC §119(e) from, U.S. Provisional Application No. 60/187,039 filed on Mar. 6, 2000, the entire content of which is expressly incorporated hereinto by reference.

FIELD OF THE INVENTION

The present invention relates generally to coatings for glass substrates. More specifically, the present invention relates to glass substrate coatings which exhibit low emissivity (so-called "low-E" coatings) and substantially no color characteristics.

BACKGROUND AND SUMMARY OF THE INVENTION

Low-E coatings for glass are well known. In this regard, commonly owned U.S. Pat. Nos. 5,344,718, 5,425,861, 5,770,321, 5,800,933 (the entire content of each being incorporated expressly herein by reference) disclose coatings formed of a multiple layer coating "system". Generally, such conventional multiple layer low-E glass coatings have a layer of a transparent dielectric material (e.g., $TiO_2$, $Bi_2O_3$, PbO or mixtures thereof) adjacent the glass substrate and a sequence of multiple layers of, for example, $Si_3N_4$, nickel (Ni), nichrome (Ni:Cr), nitrided nichrome (NiCrN) and/or silver (Ag). These conventional low-E coatings are, moreover, heat-treatable—that is, the coating is capable of being subjected to the elevated temperatures associated with conventional tempering, bending, heat-strengthening or heat-sealing processes without significantly adversely affecting its desirable characteristics.

While the conventional low-E coating systems disclosed in the above-cited U.S. patents are satisfactory, there exists a continual need to improve various properties of low-E coating systems generally. For example, continued improvements in the durability and/or color (or more accurately, lack of color) characteristics in low-E glass coatings are desired. Improvements in such characteristics are important to ensure that the coatings retain their low-E property for prolonged periods of time (even after being subjected to potentially abrasive environment encountered during the manufacturing process—e.g., the washing and cutting of glass articles having such low-E coatings) and have the desired light transmission properties. It is toward fulfilling such needs that the present invention is directed.

Broadly, the present invention is embodied in low-E glass coated glass articles comprised of a glass substrate and a multiple layer coating on a surface of the glass substrate, wherein the coating includes a layer of a transparent dielectric material adjacent the surface of the glass substrate, a layer of nitrided nichrome, and a layer of silver which is sputter coated onto the glass substrate in a nitrogen-containing atmosphere. Most preferably, the coating further includes a layer of silicon oxynitride interposed between the layer of dielectric material and the layer of nitrided nichrome.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
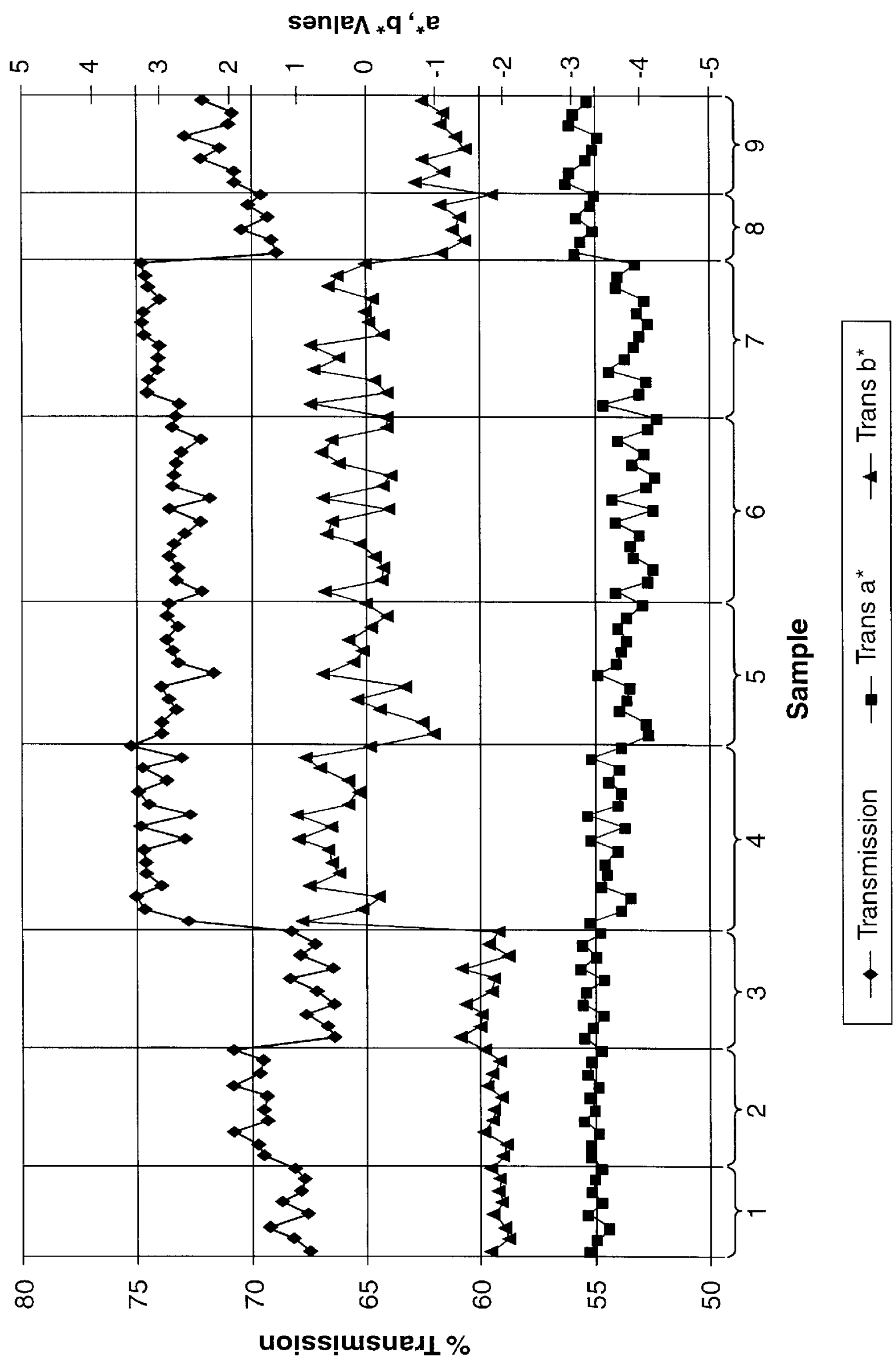
Figure 3:
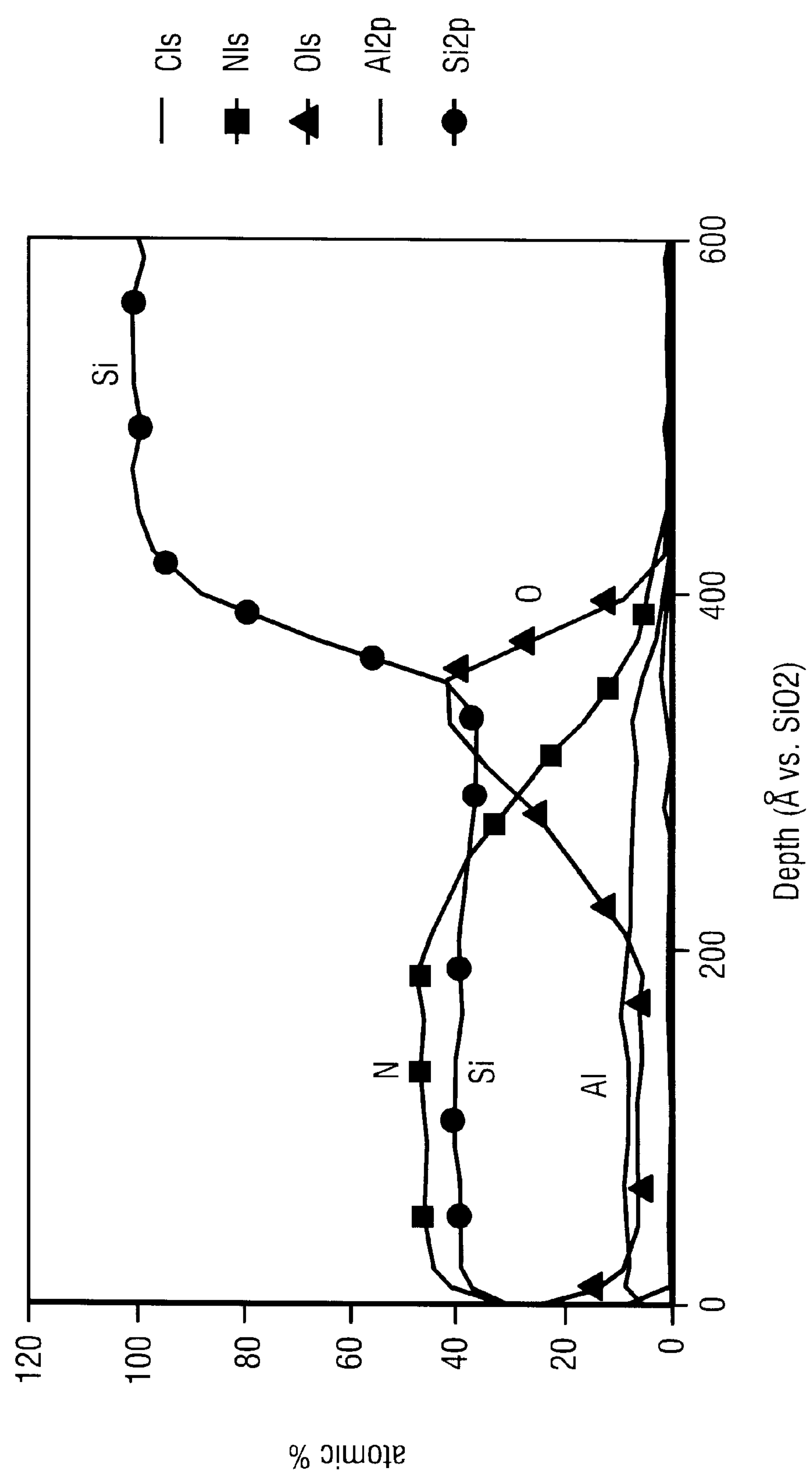

Reference will hereinafter be made to the accompanying drawings, wherein like reference numerals throughout the various FIGURES denote like structural elements, and wherein;

FIG. 1 is a is a greatly enlarged cross-sectional schematic representation of a surface-coated glass article of this invention which includes a glass substrate and a multiple layer low-E coating system coated on a surface of the glass substrate;

FIG. 2 is a graph of % Transmission and transmitted a*, b* Values for glass articles containing a low-E coating of this invention compared against other coatings not within the scope of this invention; and FIG. 3 is a graph showing the concentration, in atomic percent (at. %), of constituents of a $SiAlO_xN_y$ coating on a Si substrate according to Example III, Test Sample 3 below versus the depth of the coating in Angstroms (Å).

DETAILED DESCRIPTION OF THE INVENTION

Accompanying FIG. 1 depicts in a schematic fashion one particularly preferred embodiment of the present invention. In this regard, the multiple layer low-E coating of the present invention will necessarily be applied onto a glass substrate 10 which is, in and of itself, highly conventional. Specifically, the glass substrate 10 is most preferably made by a conventional float process and is thus colloquially known as "float glass". Typical thicknesses of such float glass may be from about 2 mm to about 6 mm, but other glass thicknesses may be employed for purposes of the present invention. The composition of the glass forming the substrate 10 is not critical, but typically the glass substrate will be formed of one of the soda-lime-silica types of glass well known to those in this art.

The process and apparatus used to form the various layers comprising the low-E coating of the present invention may be a conventional multi-chamber (multi-target) sputter-coating system such as that disclosed generally in U.S. Pat. No. 5,344,718 (the entire content of which is incorporated expressly herein by reference). One particularly preferred sputter-coating system is commercially available from Airco, Inc. As is well known, the glass substrate 10 is advanced sequentially through the contiguous chambers or zones which have respective atmospheres to form sputter-coating layers of desired constituency and thickness.

As depicted in FIG. 1, one particularly preferred low-E coating may be formed of the following layers and layer thicknesses (identified sequentially from adjacent the glass substrate 10 toward the outside):

| Layer | Constituent | Thickness Range (Å) | Thickness Preferred (Å) |
|---|---|---|---|
| (u) | transparent dielectric | about 100–200 | about 125 |
| (a) | silicon nitride ($Si_3N_4$) | about 25–200 | about 125 |
| (b) | nitrided nichrome (NiCrN) | about 2–40 | about 10 |
| (c) | silver (Ag)[1] | about 100–200 | about 145 |
| (d) | nitrided nichrome (NiCrN) | about 2–40 | about 20 |
| (e) | silicon nitride ($Si_3N_4$) | about 350–600 | about 480 |

[1]Silver is sputter-coated onto the glass substrate surface in a nitrogen-containing atmosphere.

The undercoat layer (u) in FIG. 1 is selected so it has an index of refraction at 550 nm wavelength of about 2.5 to about 2.6, and preferably about 2.52. Preferably, the under-coat layer (u) includes at least one transparent dielectric selected from $TiO_2$, $BiO_3$, PbO and mixtures thereof. $TiO_2$ is especially preferred.

The low-E coated glass article embodying the present invention will exhibit a relatively high light transmissivity (i.e., greater than about 72%) and will have acceptable a* and b* transmission of between about −2.0 to −4.0 (preferably about −3.0) for a* transmission, and between about −0.5 to about 1.5 (preferably about 0.5) for b* transmission.

According to the present invention, nitrogen gas is used in the sputtering zone to form the NiCr layer and the Ag layer. Most preferably, the gas will be a mixture of nitrogen and argon, wherein less than about 25% of the gas is nitrogen and greater than about 75% of the gas is argon. Most preferably, nitrogen is present in the sputter zones using nichrome (i.e., 80% Ni/20% Cr) and silver targets to form the nitrided nichrome and silver layers, respectively, in an amount between about 5% to about 25%. A ratio of argon to nitrogen of 85:15 is especially preferred in each such sputtering zone.

Advantageously, oxygen is employed in the sputtering zone during the formation of layer (a) so as to form a silicon oxynitride. Most preferably, the silicon oxynitride layer (a) is sputter-coated in a gaseous atmosphere comprised of nitrogen, oxygen and argon, wherein at least between about 5% to about 50%, most preferably about 10%, of the gas is oxygen. A particularly preferred atmosphere for sputter-coating the silicon oxynitride layer (a) is about 30% $N_2$, about 10% $O_2$ and about 60% $Ar_2$.

According to the present invention, the rate at which oxygen gas is incorporated into a silicon nitride layer (a) during formation can be varied so as to obtain a silicon oxynitride layer having an oxygen gradient. By the term "oxygen gradient" is meant that the concentration of oxygen (atomic percent (at. %)) decreases from one location in a silicon oxynitride layer to another location at a different depth in that same layer. If present, the oxygen gradient is most preferably such that the greater amount of oxygen concentration is nearer the bottom of the layer (i.e., towards the glass substrate) with the lesser amount of oxygen concentration being nearer the top of the layer (i.e., away from the glass substrate). In terms of the decrease in oxygen concentration, the oxygen gradient layer may throughout the layer depth be substantially linear or non-linear. Alternatively (or additionally), the layer may include decreasing oxygen concentrations that are both linear and non-linear at selected regions thereof throughout the layer depth.

The oxygen gradient layer may be obtained by introducing a portion of oxygen gas at the leading section of the coater zone where the deposition of silicon nitride occurs. While not wishing to be bound by any particular theory, it is believed that the oxygen gradient layer is in part responsible for improved mechanical durability in sputter coated glass products which are subsequently heat treated.

The oxygen gradient that may be present in the coatings of the present invention is most typically embodied in a decrease in the oxygen concentration, expressed in atomic percent (at. %), which is present in the layer per unit depth of the layer, expressed in Angstroms (Å), of about 0.6 at. %/Å or less. Oxygen gradients of between about 0.1 to about 0.6 at. %/Å are thus embodied in the present invention. According to some especially preferred embodiments, an oxygen gradient of between about 0.15 to about 0.25 at. %/Å is obtained.

As one specific example, a plot of atomic percent vs. depth was generated for Test Sample 3 of Example III below and is presented as accompanying FIG. 3. As shown therein, the oxygen concentration decreases from between about 35 to about 40 at. % at a depth of about 375 Å in the coating, to a relatively constant value of about 5 at. % at a layer depth of about 200 Å.

Those skilled in this art will recognize that a wide variety of oxygen gradient layers may be produced depending on the particular process techniques employed. For example, variations in the line speed of the glass substrate through the sputter coater and/or variations in the quantity of oxygen introduced at the leading edge of the coater zone may be employed so as to produce a silicon oxynitride layer having the desired oxygen gradient.

A greater understanding of this invention will be achieved by careful consideration of the following non-limiting Examples.

EXAMPLES

Example I

A low emissivity coating comprised of layers (u) through (e) as identified generally in FIG. 1 was applied onto a float glass substrate using a multi-chamber sputter-coater (Airco, Inc.) at a line speed of 175 in/min under the following conditions:

| Layer | Conditions |
|---|---|
| Layer (u): | TiO2 - 6 Dual C-MAG cathodes (12 Ti metal targets)<br>Three cathodes are in the first coat zone (CZ1) and three are in the second Coat Zone (CZ2).<br>Each coat zone is run identically - DC Reactive sputtering<br>Pressure = 3.5 mTorr<br>Gas Ratio (60% O2/40% Ar)<br>Total gas flow = 1850 (sccm)<br>Power - ~80 kW per target |
| Layer (a): | SixNy - 3 Dual C-MAG cathodes (6 Plasma Sprayed Si/Al targets ~8% Al)<br>Bi-Polar Pulsed DC power<br>Pressure = 2.5 mTorr<br>Gas Ratio (30% N2, 70% Ar)<br>Total gas flow = 1425 sccm<br>Power - ~5 kW per target |
| Layer (b): | NiCrN - 1 Planar cathode (80% Ni/20% Cr)<br>DC Sputtered<br>Pressure = 2.5 mTorr<br>Gas Ratio (85% Ar, 15% $N_2$)<br>Total gas flow = 1125 sccm<br>Power - ~4.0 kW per target (Range 3 to 5 kW) |
| Layer (c): | Ag - 1 Planar Cathode (100% Silver)<br>DC Sputtered<br>Pressure = 2.5 mTorr<br>Gas Ratio (85% Ar, 15% $N_2$)<br>Total gas flow = 1125 sccm<br>Power - ~7.75 kW per target (Range 5 to 9 kW, Rs = 3 to 10 Ohm per square) |
| Layer (d) | NiCrN - 1 Planar cathode (80% Ni/20% Cr)<br>DC Sputtered<br>Pressure = 2.5 mTorr<br>Gas Ratio (85% Ar, 15% $N_2$)<br>Total gas flow = 1125 sccm<br>Power - ~4.0 kW per target (Range 3 to 5 kW) |
| Layer (e): | SixNy - 3 Dual C-MAG cathodes (6 Plasma Sprayed Si/Al targets ~8% Al)<br>Bi-Polar Pulsed DC power<br>Pressure = 2.5 mTorr<br>Gas Ratio (60% N2, 40% Ar)<br>Total gas flow = 2050 sccm<br>Power - ~28 kW per target |

Example II

Example I was repeated except that layer (a) was sputter-coated using the following conditions to form a silicon oxynitride:

| | |
|---|---|
| Layer (a): | SiOxNy - 3 Dual C-MAG cathodes (6 Plasma Sprayed Si/Al targets ~8% Al)<br>Bi-Polar Pulsed DC power<br>Pressure = 2.5 mTorr<br>Gas Ratio (30% N2, 10% O2, 60% Ar)<br>Total gas flow = 1425 sccm<br>Power - ~7 kW per target |

Example III

Test Samples obtained from Example I (identified as Sample Nos. 4 and 5) and Example II (identified as Sample Nos. 6 and 7) were tested for light transmissivity and transmitted a*, b* Values. In comparison, Test Sample Nos. 1 2 and 8–9 having non-nitrided NiCr and Ag layers (all other layers in the stack being substantially the same as Sample Nos. 4–7) were also tested for light transmissivity and a*, b* Values. Comparative Test Sample No. 3 was identical to Test Sample Nos. 1–2, except that a layer of silicon oxynitride was interposed between the $TiO_2$ and NiCr layers. The data appear in accompanying FIG. 2.

As will be observed, the transmissivity of Samples 4–7 was acceptably high (i.e., greater than about 72%) with low a* transmission Values. In this regard, it was noted that, even though the b* Value of Sample Nos. 4–7 increased as compared to Test Sample Nos. 1–3 and 8–9, the greater transmissivity of the former made the b* Value less critical. Thus, it was noted that when the transmission is high, the "blue" color hue is less sensitive.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A surface-coated glass article comprised of a glass substrate and a multiple layer coating on a surface of the glass substrate, wherein said coating includes a layer of a transparent dielectric material adjacent the surface of the glass substrate, respective layers comprising nichrome and silver each sputter-coated onto the glass substrate in a nitrogen-containing atmosphere, and a layer comprising silicon oxynitride interposed between said layer of dielectric material and said layer comprising nichrome.

2. The surface-coated glass article of claim 1, wherein said silicon oxynitride layer includes an oxygen gradient layer.

3. The surface-coated glass article of claim 2, wherein said oxygen gradient layer has an oxygen concentration which decreases between about 0.1 to about 0.6 at. %/Å from one location in the layer to another location at a different depth in the layer.

4. The surface-coated glass article of claim 3, wherein said oxygen gradient layer has an oxygen concentration which decreases between about 0.15 to about 0.25 at. %/Å.

5. The surface-coated glass article of claim 2, 3 or 4, wherein said oxygen gradient layer has an oxygen concentration which is greater at a location nearer to the glass substrate.

6. The surface-coated glass article of claim 1, wherein the dielectric material is at least one selected from the group consisting of $TiO_2$, $BiO_3$, PbO and mixtures thereof.

7. The surface-coated glass article as in claim 1, wherein the coating further includes, from the layer of silver outwardly, a second layer of nitrided nichrome, and an outer layer of $Si_3N_4$.

8. A surface-coated glass article comprised of a glass substrate and a multiple layer coating comprising the following layers formed on a surface of the glass substrate, from the surface outwardly:

(1) a layer of transparent dielectric material;

(2) a layer of silicon oxynitride;

(3) a first layer of nitrided nichrome;

(4) a layer of silver which is sputter-coated onto the glass substrate in a nitrogen-containing atmosphere;

(5) a second layer of nitrided nichrome; and (6) an outer layer of $Si_3N_4$.

9. The surface-coated glass article of claim 8, wherein the dielectric material is at least one selected from the group consisting of $TiO_2$, $BiO_3$, PbO and mixtures thereof.

10. The surface-coated glass article of claim 1 or 8, having a light transmission of at least about 72%.

11. The surface-coated glass article of claim 10, having transmitted a*, b* Values of between about −2.0 to −4.0, and between about −0.5 to about 1.5, respectively.

12. The surface-coated glass article of claim 8, wherein the layers have the following thicknesses in Angstroms:

(1) between about 100–200;

(2) between about 25–200;

(3) between about 2–40;

(4) between about 100–200;

(5) between about 2–40; and (6) between about 350–600.

13. A coated article including a coating supported by a glass substrate, the coating comprising, in the following order going away from the glass substrate:

a dielectric layer;

a layer comprising silicon oxynitride;

a first layer comprising $NiCrN_x$;

a layer comprising Ag;

a second layer comprising $NiCrN_x$; and a layer comprising silicon nitride.

14. A coated article including a coating supported by a glass substrate, the coating comprising, in the following order going away from the glass substrate:

a dielectric layer;

a layer comprising silicon oxynitride;

a first contact layer for contacting Ag;

a layer comprising Ag;

a second contact layer for contacting Ag; and another dielectric layer.

15. The coated article of claim 14, wherein at least one of the contact layers comprises NiCr, and wherein said another dielectric layer comprising silicon nitride.

* * * * *

US006623846C1

(12) INTER PARTES REEXAMINATION CERTIFICATE (521st)

United States Patent

Laird

(10) Number: US 6,623,846 C1

(45) Certificate Issued: Feb. 8, 2013

(54) LOW-EMISSIVITY GLASS COATINGS HAVING A LAYER OF NITRIDED NICHROME AND METHODS OF MAKING SAME

(75) Inventor: Ronald E. Laird, Washtenaw, MI (US)

(73) Assignee: Guardian Industries, Corp., Auburn Hills, MI (US)

Reexamination Request:
No. 95/000,424, Dec. 19, 2008

Reexamination Certificate for:

| | |
|---|---|
| Patent No.: | **6,623,846** |
| Issued: | **Sep. 23, 2003** |
| Appl. No.: | **09/797,903** |
| Filed: | **Mar. 5, 2001** |

Related U.S. Application Data

(60) Provisional application No. 60/187,039, filed on Mar. 6, 2000.

(51) Int. Cl.
*C03C 17/36* (2006.01)

(52) U.S. Cl. ........ 428/216; 428/428; 428/432; 428/469; 428/701; 428/702

(58) Field of Classification Search ........................ None
See application file for complete search history.

(56) References Cited

To view the complete listing of prior art documents cited during the proceeding for Reexamination Control Number 95/000,424, please refer to the USPTO's public Patent Application Information Retrieval (PAIR) system under the Display References tab.

*Primary Examiner* — Alan Diamond

(57) ABSTRACT

Low-E glass coated glass articles are comprised of a glass substrate and a multiple layer coating on a surface of the glass substrate. Relatively high light transmissivity of greater than about 72% and satisfactory color characteristics are achieved. The coating includes a layer of a transparent dielectric material adjacent the surface of the glass substrate, and respective layers of nitrided nichrome and silver each of which are formed by sputter-coating onto the glass substrate in a nitrogen-containing atmosphere. Most preferably, the coating also includes a layer of silicon oxynitride interposed between the layer of dielectric material and the layer of nitrided nichrome. The silicon oxynitride layer may include an oxygen gradient layer wherein the concentration of oxygen decreases from one location in the silicon oxynitride layer to another location at a different depth in that same layer. If present, the oxygen gradient is most preferably such that the greater amount of oxygen concentration is nearer the bottom of the layer (i.e., towards the glass substrate) with the lesser amount of oxygen concentration being nearer the top of the layer (i.e., away from the glass layer).

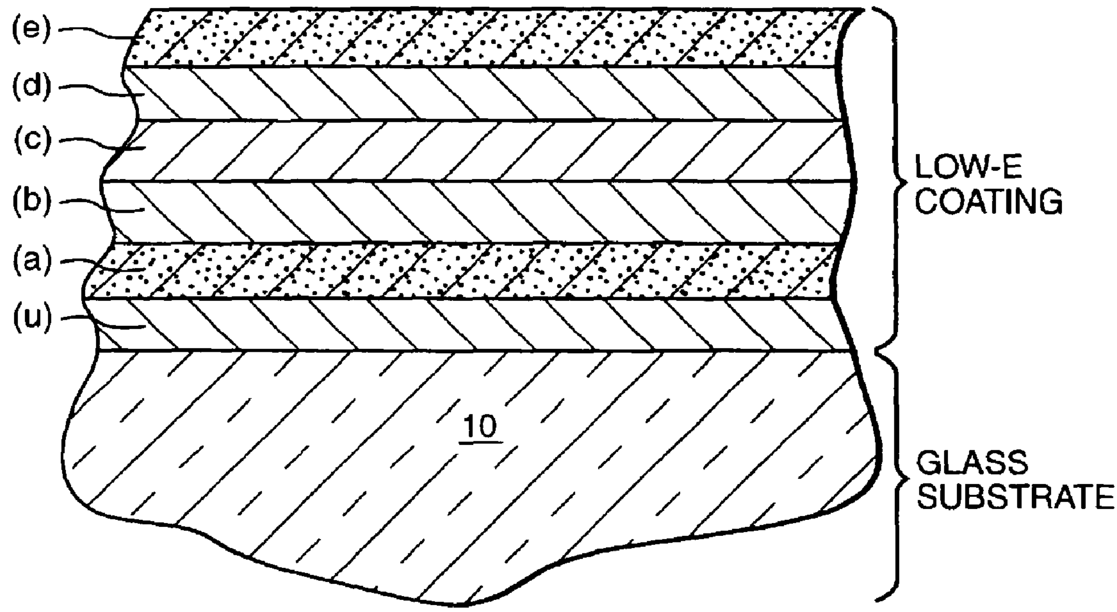

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-15 are cancelled.

* * * * *